United States Patent
Nelson et al.

[11] Patent Number: 6,025,814
[45] Date of Patent: Feb. 15, 2000

[54] ANTENNA UNIT FOR THE DOPPLER MEASUREMENT OF GRAIN FLOW

[75] Inventors: George F. Nelson, Coon Rapids; Ray E. Artz, Apple Valley; Lawrence Zierhut, Burnsville, all of Minn.

[73] Assignee: New Holland North America, Inc., New Holland, Pa.

[21] Appl. No.: 08/966,412

[22] Filed: Nov. 7, 1997

[51] Int. Cl.[7] .................................................. H01Q 1/12
[52] U.S. Cl. ........................ 343/878; 343/753; 343/890; 342/444
[58] Field of Search .................................. 343/753, 754, 343/786, 890, 878, 882, 892; 342/442, 444; 248/218.4, 220.2, 225.31

[56] References Cited

U.S. PATENT DOCUMENTS

| | | | |
|---|---|---|---|
| 2,167,286 | 7/1939 | Theobald | 343/890 |
| 2,591,486 | 4/1952 | Wilkinson, Jr. | 343/786 |
| 3,958,242 | 5/1976 | Sirven | 343/853 |
| 4,231,043 | 10/1980 | Semplak | 343/786 |
| 4,660,050 | 4/1987 | Phillips | 343/753 |
| 5,315,307 | 5/1994 | Tsui et al. | 342/444 |
| 5,619,217 | 4/1997 | Mailandt et al. | 343/872 |

OTHER PUBLICATIONS

IEEE Transactions on Industrial Electronics and Control Instrumentation, vol. IECI–22, No. 2, May 1975, pp. 224–228.

*Primary Examiner*—Don Wong
*Assistant Examiner*—Tho Phan
*Attorney, Agent, or Firm*—Griffin, Butler, Whisenhunt & Szipl, LLP

[57] ABSTRACT

An antenna unit for measuring the velocity of a flowing material by the Doppler effect is particularly suited for use where only a limited space is available. The antenna unit comprises a support block having first and second surfaces disposed at an acute angle (optimally 45°) relative to each other. A printed circuit antenna card having thereon a high gain antenna comprising a phased array of antenna elements is mounted to the second surface and radiates microwave energy toward the first surface. A plate having an opening therein is disposed adjacent the first surface, the plate being made of a material which absorbs radiated energy incident thereon. The support block is provided with a recess for receiving an absorber wedge which absorbs the energy radiated in near side lobes. The absorber wedge and plate shape the radiation pattern so that energy radiated by the antenna intercepts the material at an angle of 45°±15° when the first surface is disposed parallel to the axis of flow.

20 Claims, 4 Drawing Sheets

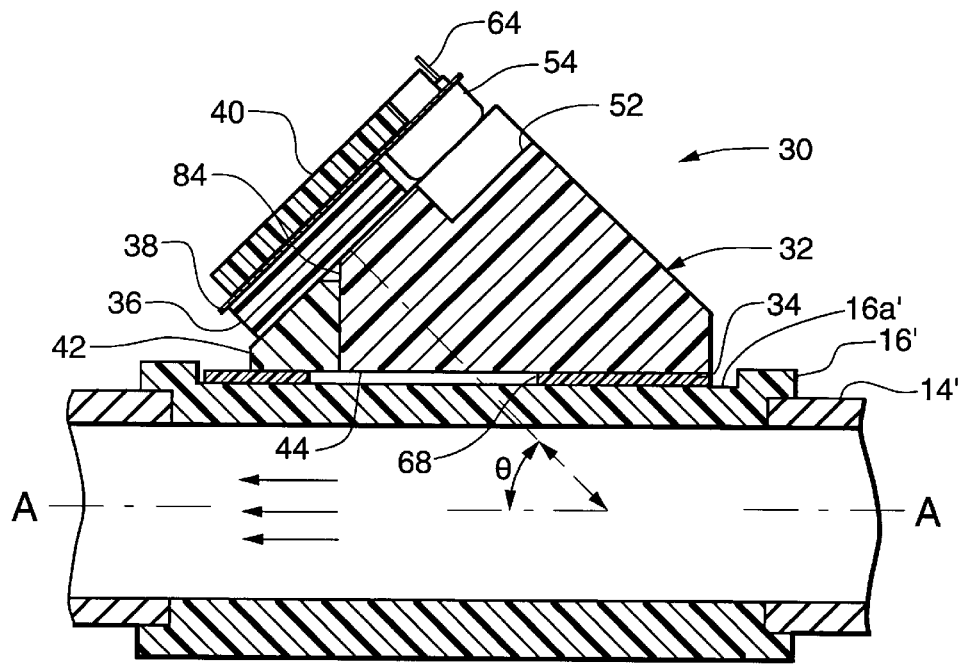
Fig. 1
Fig. 7 (PRIOR ART)
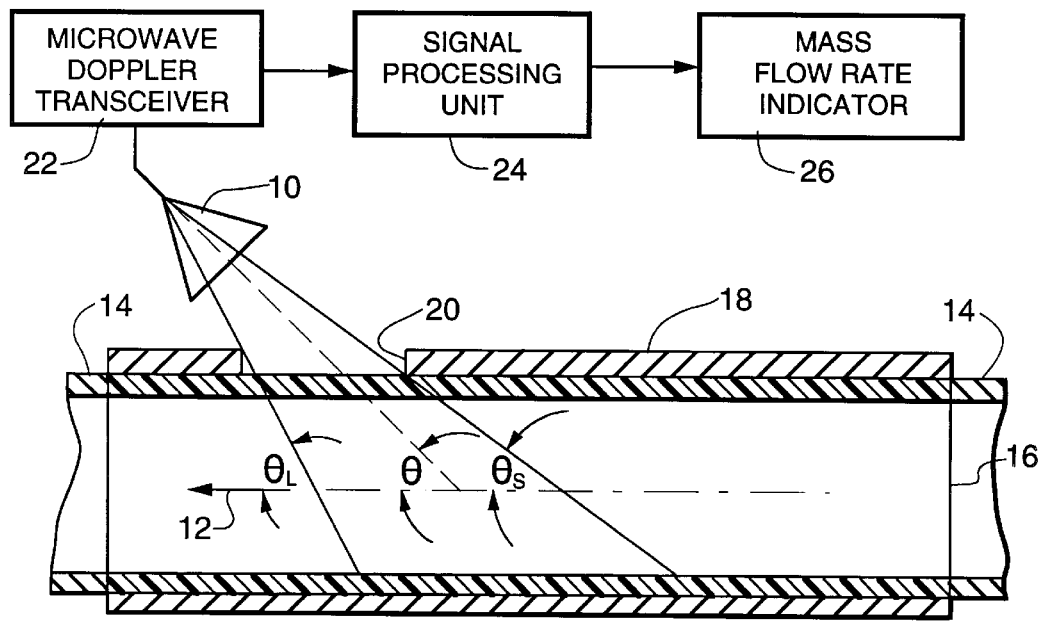

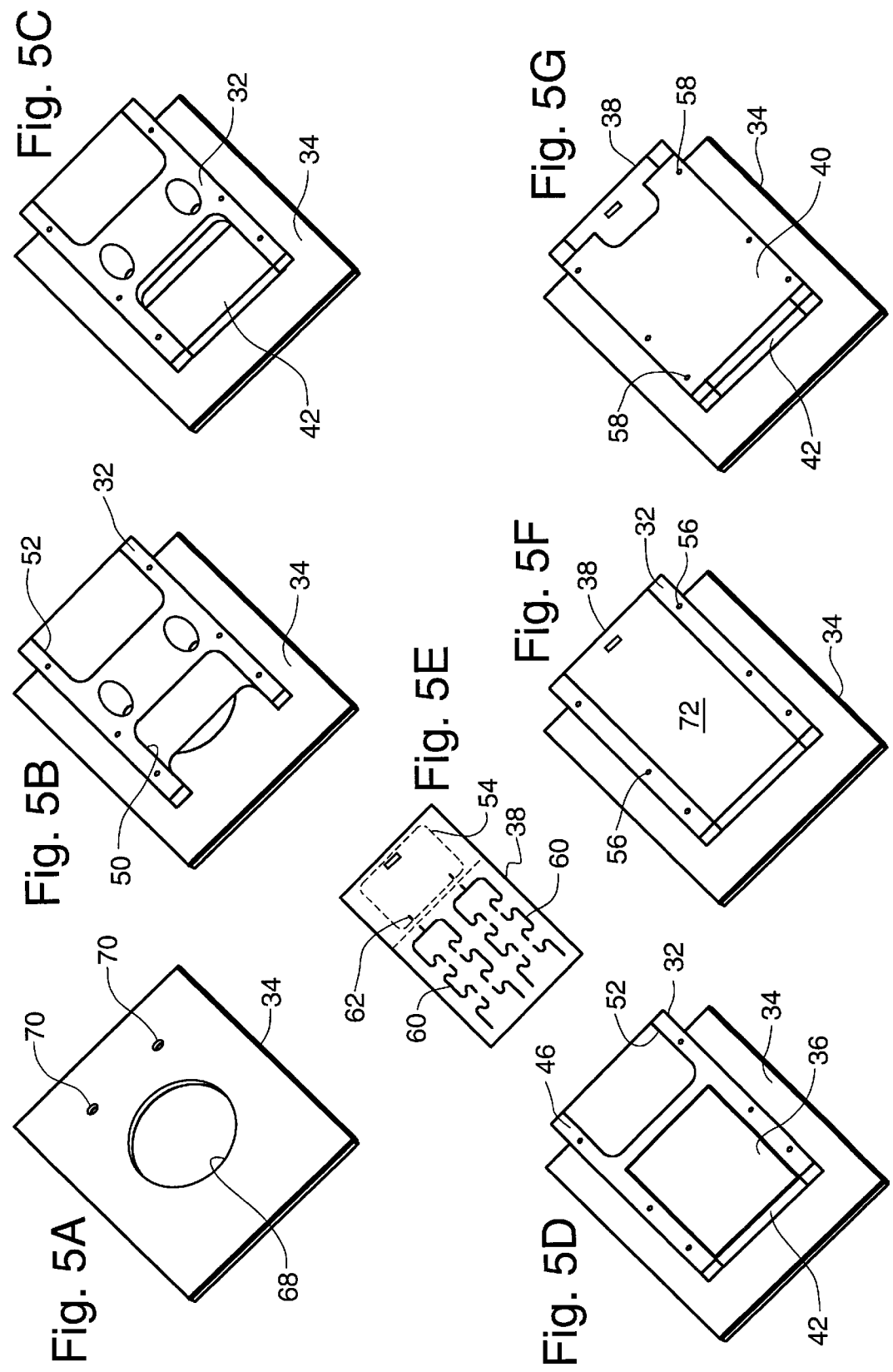

ANTENNA UNIT FOR THE DOPPLER MEASUREMENT OF GRAIN FLOW

FIELD OF THE INVENTION

The present invention relates to the measurement of the velocity of a flowing material utilizing the Doppler effect, and more particularly relates to a high gain antenna unit having structure for absorbing side lobes and constraining the main lobe of the radiation pattern emitted to sense the velocity, whereby the antenna may be disposed in close proximity to the material under test.

BACKGROUND OF THE INVENTION

It is well known in the art to utilize the Doppler effect to monitor the velocity of a material, such as grain, moving on a conveyor or flowing through a pipe or tube. An article entitled *Microwave Doppler-Effect Flow Meter*, in the publication IEEE Transactions on Industrial Electronics and Control Instrumentation, Vol. IECI-22, May 1975, pg. 224–228, describes Doppler effect flow monitors utilizing horn antennas arranged in a monostatic or bistatic configuration, that is arranged with a single transmit/receive antenna disposed on one side of the material under test, or a transmit and a receive antenna disposed on opposite sides of the material.

FIG. 7 illustrates a Doppler effect flow monitor in the monostatic configuration as described in the publication. A transmit/receive horn antenna 10 is disposed so that the axis of the radiation pattern emitted by the antenna lies at an angle θ (optimally 45°) relative to the direction of grain flow indicated by arrow 12. The grain is contained by a pipe 14 having a pipe section 16 made of a material transparent to the radiated frequency. The section 16 is covered by a layer 18 of material which absorbs RF at the frequency emitted by the antenna. The layer 18 is provided with a window 20 to permit entry of radiation into the pipe and passage of reflected RF from the grain back to the horn antenna. The described purpose of layer 18 is to absorb and minimize extraneous reflections from surfaces other than the grain particles.

Antenna 10 radiates or transmits a continuous wave microwave signal of fixed frequency through window 20 and the wall of RF transparent pipe section 6 so as to intercept individual grain particles moving through the pipe. The transmitted signal is reflected back toward the antenna 10 at a second frequency which depends on the velocity of the grain. The frequency difference between the frequency of the transmitted signal f and the frequency of the reflected signal is the Doppler frequency $f_d$. By counting cycles of the Doppler signal over an interval of time, the grain velocity can be calculated according to the equation $$v = (c/2f \cos \theta) f_d \qquad (1)$$

where c is the speed of light in m/s, f is the frequency of the transmitted signal in Hz, $f_d$ is the frequency of the Doppler signal in Hz and θ is the antenna viewing angle, that is, the angle between the axis of the main lobe of the radiation pattern and the axis of the pipe section through which the grain is moving.

In actual practice, the reflected signal comprises a spectrum of Doppler frequencies resulting from interception of the transmitted signal at different angles by individual grain particles moving at different speeds. As illustrated in FIG. 7, the angles of interception extend over a range from $\theta_L$, larger than the angle θ, to the angle $\theta_s$ smaller than the angle θ. Although the off-axis interceptions affect the precision of the measurement, the average Doppler frequency $\bar{f}_d$ is proportional to the average velocity $\bar{v}$ so that the velocity may be calculated with a fair degree of precision according to the formula $$\bar{v} = (c/2f \cos \theta) \bar{f}_d \qquad (2)$$

In FIG. 7, a transceiver 22 energizes antenna 10 to transmit the continuous wave microwave signal, and detects the signal reflected back to the antenna from the grain particles. The reflected and detected signal which, as noted above, comprises a spectrum of frequencies, is processed in a signal processing unit 24. The time and complexity of the processing is dependent on the number of frequencies or width of the spectrum of frequencies of the reflected signal since the processing requires computation of a plurality of Doppler frequencies $f_d$ and an averaging of these frequencies to obtain $\bar{f}_d$ before the average velocity $\bar{v}$ may be calculated.

Once the average velocity is calculated, processing unit 24 calculates the mass flow rate of the grain according to the formula $$Q = AD\bar{v}$$

where Q is the mass flow rate in kg/s, A is the cross-sectional area in $m^2$ of the grain flow path within pipe 14, D is the bulk density of the grain in $kg/m^3$, and $\bar{v}$ is the average velocity in m/s. The value of Q may then be displayed on an indicator 26.

The publication discussed above does not directly mention the problem of Doppler error introduced into the velocity measurement by side lobe responses of the transmitted radiation pattern when the antenna is placed in close proximity to the grain flow path. The authors do suggest that the optimum distance between the antenna aperture and the axis of the flow pipe be between $W^2/\pi2$ and $2W^2/\pi2$ where W is the width of the antenna aperture which controls the radiation pattern of interest. In experiments described in the publication, the antenna was placed at a distance of 0.1 m from the wall of the flow pipe.

Generally speaking, Doppler errors due to side lobe responses have been reduced in Doppler velocity monitors by appropriate selection of the distance between the antenna and the flow path. The shortest distance where the side lobes are not a problem is a function of antenna gain and the wavelength of the transmitted signal. The conventional approach has been to place the antenna at the closest distance to the flow path where the side lobe components do not add to the Doppler frequency spectrum, and this may vary from several inches to many feet. This requirement, together with the physical size of horn antennas, makes such antennas unsuitable for use in practical applications where only limited space is available for the antenna.

U.S. Pat. No. 2,591,486 teaches the use of dielectric spacers to absorb side lobes of a horn antenna in a radio echo detection system. However, the use of spacers disposed as taught in this patent would not serve to reduce the Doppler spectrum resulting from main lobe responses in a Doppler velocity monitor.

High gain antennas comprising a phased array of antenna elements on a printed circuit antenna card are commercially available. These antennas are much smaller than horn antennas thus making them more suitable for use when space is a limiting factor.

The beam width of the main lobe radiated by a high gain antenna decreases as the gain increases. The narrow beam width makes the antennas desirable for use in flow monitors because it reduces the range of the angles of incidence of the beam on the material under test, thus reducing the width of the Doppler frequency spectrum. However, to realize the narrow beam width the antenna must be spaced a considerable distance from the material under test thus making the antenna less desirable for use where only limited space is available.

SUMMARY OF THE INVENTION

An object of the present invention is to provide a high gain antenna unit suitable for use in a Doppler effect velocity monitor where only limited space is available for mounting the monitor.

Another object of the invention is to provide a high gain antenna unit for Doppler measurement of the velocity of a material, the antenna unit being characterized in that the antenna therein may be mounted close to the material under test. Depending on the operating frequency the antenna may be disposed less than one wave length of the transmitted signal from the grain path and in a preferred embodiment the antenna unit is mounted directly on a pipe conveying flowing grain.

Yet another object of the invention is to provide an improved Doppler effect velocity monitor wherein the range of the Doppler frequency spectrum is reduced by constraining the width of the transmitted radiation pattern.

A further object of the invention is to provide a high gain antenna unit as described above and having means for absorbing the energy in side lobes of the radiation pattern. In one embodiment, a lossy conductive wedge, disposed between the antenna and the flow path, absorbs the energy of the side lobes on one side of the radiation pattern nearest the flow path and at the same time absorbs the energy of the most off-axis radiation of the main lobe to constrain the width of the main lobe on the one side. In a second embodiment the axis of the main lobe is directed at an angle through an aperture in a lossy conductive plate which absorbs the energy of the side lobes on the one side of the radiation pattern and constrains the width of the main lobe by absorbing the energy of the most off-axis radiation on both sides of the main lobe. In a third embodiment, both the absorptive block and the absorptive plate are used to absorb the energy of the side lobes and constrain the width of the main lobe.

Yet another object of the invention is to provide a method of increasing the accuracy of a velocity measurement made by a Doppler effect flow monitor, the method comprising constraining the pattern of radiation of the main lobe of the transmitted radiation to a limited angle bisected by the axis of the main lobe so that the range of the Doppler effect spectrum of frequencies is reduced and errors resulting from near and far side off-axis incidences of the radiation on the material under test tend to cancel.

Other objects and advantages of the invention will become apparent upon consideration of the following description and the accompanying drawings.

BRIEF DESCRIPTION OF THE DRAWINGS

FIG. 1 is a sectional view of an antenna unit according to the invention mounted on a conveyor pipe;

FIGS. 5A–5G illustrate steps in assembling the antenna unit;

DESCRIPTION OF PREFERRED EMBODIMENTS

Figure 2:
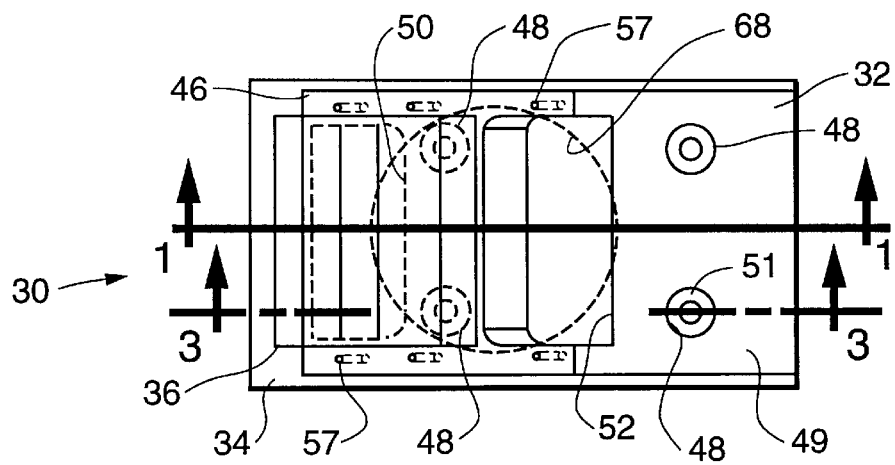
FIG. 2 is a top view of the antenna unit showing a support block, aperture plate and compression pad forming part of the antenna unit.

FIG. 1 shows a preferred embodiment of an antenna unit 30 according to the invention mounted for measuring, by means of the Doppler effect, the velocity of grain being conveyed through a grain feed pipe or pipe 14' of a grain harvesting machine. The grain feed pipe 14' is provided with a section 16' that is transparent to microwaves at the operating frequency of an antenna disposed on a printed circuit antenna card 38. That is, the section 16' passes the signal radiated by the antenna with no or minimal absorption of the signal energy. The operating frequency is the frequency of the continuous microwave signal radiated by the antenna. This frequency is above about 1 GHz and in a typical embodiment the frequency may be 10.525 GHz.

The feed pipe section 16' is provided with a flat surface 16a' extending parallel to the path of grain flow, that is, parallel to the axis A—A of the pipe section. The antenna unit 30 is mounted directly on the flat surface, that is, with surface-to-surface contact between the surface 16a' and the bottom surface of the antenna unit.

As illustrated in FIGS. 1–4, antenna unit 30, in one embodiment, comprises a support block 32, an aperture plate 34, a spacer 36, a printed circuit antenna card 38, a backing plate 40 and an absorber block or wedge 42.

The support block 32, in section, has a generally triangular shape with a flat bottom or first surface 44 (FIG. 3), a flat top or second surface 46 lying at an angle (optimally 45°) relative to the first surface, and a third surface 49 extending normal to the second surface. By way of example only, the first surface 44 may be about 5.4" long and the vertical distance from the first surface to the junction of the second and third surfaces 46, 49 may be about 3.3".

Four countersunk holes 48 (FIG. 2) extend vertically through the support block 32. Holes 48 receive mounting bolts 51 (one shown in FIGS. 2 and 3) for mounting or securing the antenna unit in a fixed position relative to a flow path. For example, the mounting bolts may be screwed into threaded holes (not shown) extending into the flat surface 16a' to secure the antenna unit to the pipe section 16'.

Support block 32 is provided with a first recess 50 for receiving the absorber wedge 42. This recess opens out to both the first and second surfaces 44, 46 as best seen in FIGS. 5B and 5D. A second recess 52 is provided in the support block for accommodating electronic elements and an RF shield cover or housing 54 (FIG. 1) covering the electronic elements on the printed circuit antenna card 38. Recess 52 opens out to both the second and third surfaces 46, 49 of the support block.

Support block 32 is made of plastic or other material that is transparent to RF at the antenna operating frequency. That is, the support block is made of a material which passes radiation at the operating frequency with no, or minimal effect on the radiation.

The support block 32 is provided with a plurality of threaded holes 56 extending into the support block from the second surface 46. A plurality of screws 57 (FIG. 2) extend through unthreaded openings 58 in the backing plate 40 and into holes 56 to secure the backing plate to the support block and compress the printed circuit antenna card 38 and spacer 36 between the backing plate and the support block. As best shown in FIGS. 5F and 5D, the widths of the antenna card 38 and spacer 36 are less than the distance between openings 56 on opposite sides of support block 32 so that the screws securing the backing plate to the support block do not pass through either the antenna card or the spacer.

The backing plate 40 is a rigid plastic plate that serves the dual purpose of clamping the spacer 36 and antenna card 38 to the support block 32 and providing a rigid backing against which the antenna card is pressed by the spacer 36. This prevents flexing of the antenna card which, if allowed to occur, would cause Doppler interference signals of considerable magnitude.

Spacer 36 may be a piece of polyethylene foam about one-half inch thick. Other materials may be used provided they are transparent to the operating frequency and have a degree of resiliency permitting them to conform to surface features of the antenna card. The primary purpose of the spacer is to space antenna elements on the antenna card 38 away from the surface 46 of support block 32 so as to avoid the detuning effects of the support block. The spacer serves the secondary purpose of pressing the antenna card against the rigid backing plate 40 with a degree of resilience so that circuits on the card are not damaged as the screws are tightened to draw the backing plate toward the support block.

Figure 3:
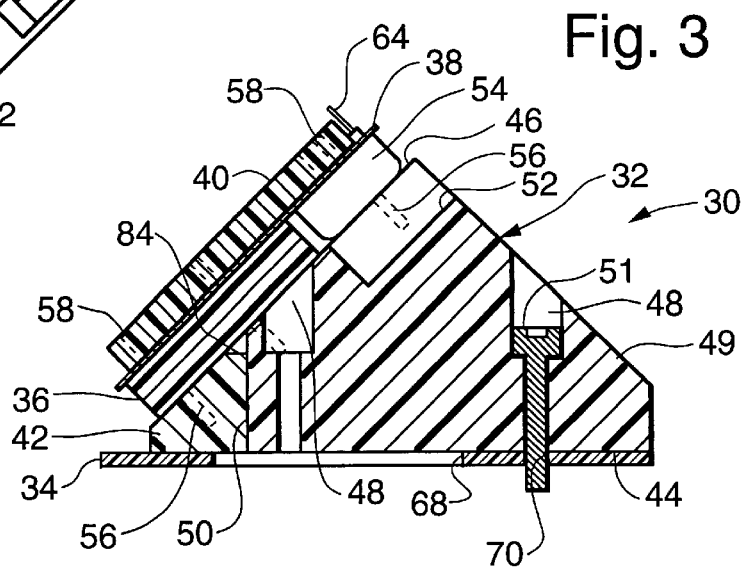
FIG. 3 is a sectional view of a complete antenna unit taken along the line 3—3 of FIG. 2.

The printed circuit antenna card 38 (FIG. 5E) includes an antenna comprising a phased array of printed circuit antenna elements 60 connected by printed circuit connectors 62 to microwave oscillator Doppler circuit components mounted on the card and contained within the RF shield cover 54. The circuit components are of conventional design. Three connectors 64, one of which is shown in FIGS. 1 and 3, are provided on the antenna card for supplying power to the circuit components and transferring signals to and from the antenna elements via the circuit components to a signal processing unit such as the processing unit 24 shown in FIG. 7.

The antenna elements are phased together in a manner well known to those familiar with antenna design to provide gain normal to the plane of the antenna card 38 and generate a radiation pattern having a main lobe 86 (FIG. 6B) symmetrical about an axis X—X.

The aperture plate 34 (FIG. 5A) comprises a flat sheet of material that absorbs radiation energy at the operating frequency. The aperture plate is cut to fit the flat surface 16a' (FIG. 1) and the plate is provided with an aperture 68 which permits radiation from the antenna elements to exit the antenna unit after passing through the support block 32. The aperture may be circular in shape but other shapes are also suitable. In a practical embodiment, the aperture plate 34 may measure 4" by 6" and the aperture 68 may be 2½" in diameter if circular.

Two holes 70 are provided in the aperture plate 34 for the passage of two of the mounting 51 bolts which secure the support block 32 to a mounting. The other two of the mounting bolts extend through opening 68 as best visualized from FIGS. 2 and 3.

FIGS. 5A–5G illustrate steps in assembling the antenna unit 30. Glue is placed on the bottom surface of support block 32 and the support block brought into contact with the top surface of aperture plate 34 as illustrated in FIG. 5B with the holes 70 in the aperture plate aligned with two of the holes 48 in the support block. The glueing of the aperture plate to the support block is not required because the aperture plate is positioned and clamped relative to the support block by screws 51.

Next, glue is applied to the sides of absorber wedge 42 and the wedge is inserted into the recess 50 of the support block, thereby securing the wedge to the support block as shown in FIG. 5C. Again, glueing is not essential but is preferred.

The assembly comprising the aperture plate 34, support block 32 and absorber wedge 42 is then placed on the flat surface 16a' of FIG. 1. Bolts 51 are inserted into holes 48 and screwed into the threaded holes (not shown) in the surface 16a' to secure the assembly to the pipe section 16'.

Next, compression pad 36 is positioned on the top surface 46 of the support block as shown in FIG. 5D. The printed circuit antenna card 38 is placed on top of compression pad 36 with the housing 54 facing into recess 52, the antenna elements 60 facing toward the aperture 68 in plate 34, and the ground plane side 72 of the antenna card facing away from the support block as shown in FIG. 5F.

Finally, the backing plate 40 is positioned over the antenna card and screws 57 (FIG. 2) are inserted through holes 58 in the backing plate and screwed into the threaded holes 56 (FIG. 3) in the support block 32 until the compression pad 36 and antenna card 38 are compressed between the backing plate and the support block. As the backing plate is being secured to the support block, the fastening screws 57 are tightened so that the antenna card is substantially parallel to the second surface 46 of the support block. As a result, the antenna elements 60 lie in a plane at an angle of about 45° relative to the aperture 68 in aperture plate 34.

Figure 4:
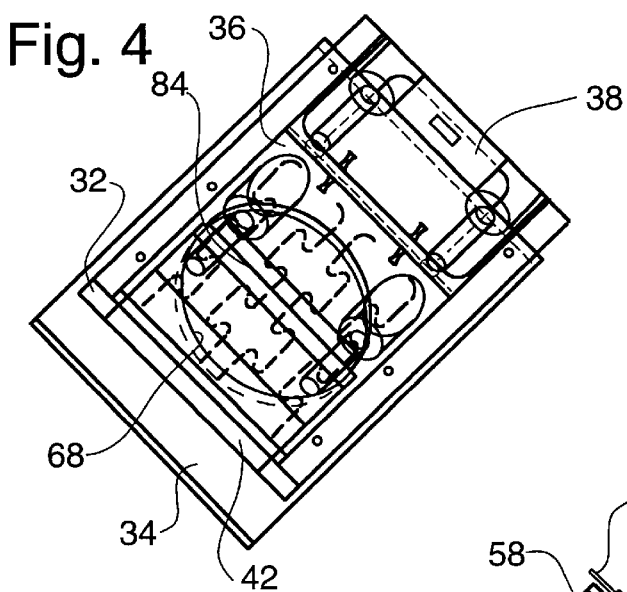
FIG. 4 is a view of the antenna unit looking normal to the backing plate, the parts being shown as optically transparent to illustrate the aperture seen by the antenna elements.
Figure 6A:
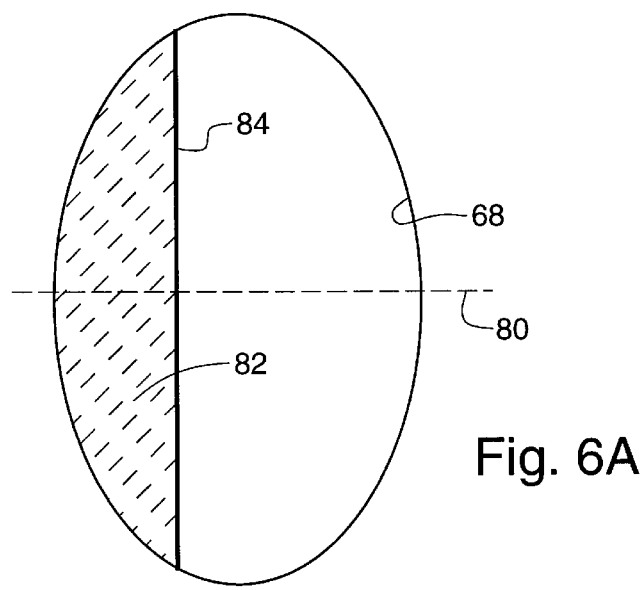
FIGS. 6A and 6B are schematic diagrams illustrating containment of the pattern of radiation of the antenna unit by the absorber wedge and the aperture plate; and, FIG. 7 is a schematic illustration, partly in section, of a prior art Doppler effect flow monitor.

Without the absorber wedge 42, the aperture 68, as 'seen' by the antenna, would thus appear to be a window in the form of an ellipse as illustrated in FIGS. 4 and 6A with the minor axis 80 of the ellipse extending parallel to the axis A—A of the pipe section 16' on which the antenna unit is mounted. However, the absorber wedge 42 extends into the field of the signal radiated by the antenna in the region between the antenna and the window to thereby limit the 'view' of the window as seen by the antenna. This is illustrated in FIG. 6A wherein the absorber wedge is disposed so as to block from the view of the antenna the shaded portion 82 with the uppermost and rightmost edge 84 of the absorber wedge defining the limit of the shaded portion.

Figure 6B:
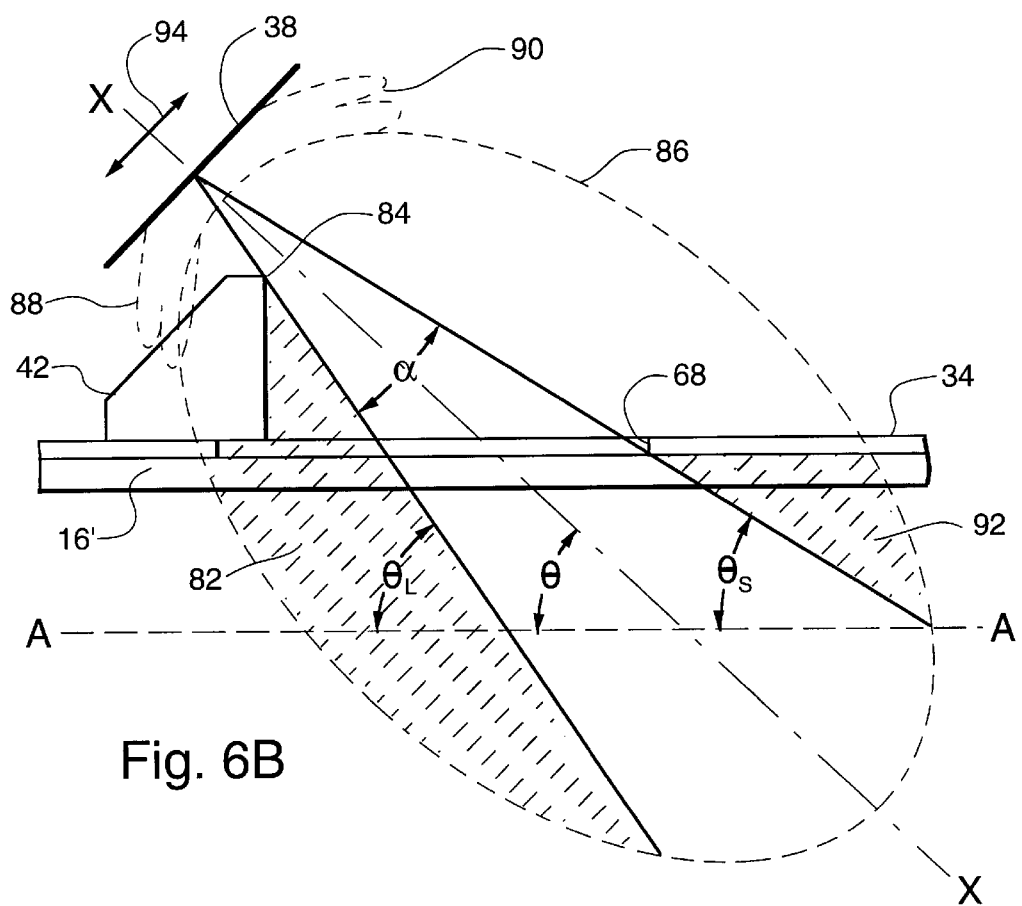

FIG. 6B illustrates the containment of the radiation pattern by the aperture plate 34 and absorber wedge 42. The antenna generates a radiation pattern comprising a main lobe 86, near side lobes 88 and far side lobes 90. Due to the mounting of the support block 32 with its first surface 44 (FIG. 3) parallel to the axis A—A of the pipe section 16', the mounting of the antenna card 38 parallel to the second surface 46 of the support block, and the 45° angle between the first and second surfaces, the axis X—X of the main lobe 86 intercepts the axis A—A at an angle θ=40°.

The radiation energy of the far side lobes 90 is directed away from the measurement region and does not affect the accuracy or precision of the velocity measurement. However, the radiation energy of the near side lobes 88 is directed generally in the direction of the material under measurement and reflected signals from the material affect the precision of the measurement of the velocity of the material. The absorber wedge 42 prevents this by intercepting and absorbing the energy of the near side lobe radiation.

The absorber wedge 42 also contains or limits the main lobe 86 by absorbing a portion of the near side radiation and dissipating it in the form of heat. As used herein, near side radiation means that radiation of the main lobe which, as compared to radiation along the axis X—X, has a shorter distance to travel in order to reach the material under test. In FIG. 6B, the near side radiation of main lobe 86 lies below the axis X—X. The portion of the near side radiation absorbed by wedge 42 is that portion which would otherwise be radiated into the shaded region 82.

The aperture plate 34 contains or limits the main lobe 86 by absorbing a portion of the far side radiation and dissipating it in the form of heat. As used herein, far side radiation means that radiation of the main lobe which, as compared to radiation along the axis X—X, has a longer distance to travel in order to reach the material under test. In FIG. 6B, the far side radiation lies above the axis X—X. The portion of the far side radiation absorbed by aperture plate 34 is that portion which would otherwise be radiated into the shaded region 92.

For a given size and position of aperture 68 and absorber wedge 42, the position of the antenna 38 relative to the aperture and absorber wedge determines both the magnitude of the angle $\alpha$ defining the limits of the pattern of radiation incident on the material under test, and the position of the angle $\alpha$ relative to the axis of radiation X—X. Preferably, the angle $\alpha$ is made 30° with the axis of radiation X—X bisecting the angle. With the antenna card 38 oriented so that the axis X—X is at an angle $\theta=45°$ relative to the axis A—A of material flow, the angles $\theta_L$ and $\theta_s$ will be 60° and 30°, respectively. Thus, the spectrum of the Doppler frequency response is limited to a range of frequencies resulting from incidence of the radiation on the material at a range of angles extending 15° on each side of the radiation axis. The incidences of near side off axis radiation on the material tend to produce an error in a positive direction in the determination of the average velocity $\overline{v}$ since the cosines of angles greater than $\theta$ to $\theta_L$ are less than the cosine of $\theta$. However, incidences of far side off axis radiation tend to produce an error in a negative direction because the cosines of angles less than $\theta$ to $\theta_s$ are greater than the cosine of $\theta$. Although not exactly equal, the errors from near side and far side incidences tend to cancel and the antenna provides an indication of the velocity which is more accurate than prior art devices wherein the main lobe axis does not bisect the angle of radiation incident on the material.

The positioning of the antenna card 38 in the directions indicated by the double headed arrow 94 has a significant effect on the size of the angle $\alpha$ and the relation of this angle to the main lobe axis. In a practical embodiment, an offset of only ⅛ inch in either direction of arrow 94 produced a considerable change in the precision of a velocity measurement. In a working embodiment, the dimensions of the antenna card were such that the the card could be properly aligned by bringing it into contact with a straight edge placed flat against, and extending upwardly beyond, the surface 49 of support block 32. Other conventional locator means may be employed, such as a pin or pins extending from backing plate 40 into a hole or holes provided in the antenna card.

From the foregoing description it is seen that the present invention provides an improved antenna unit for Doppler effect measurement of the velocity of a moving material. The antenna unit is characterized in that a high gain antenna may be placed in close proximity to the material under test without the adverse effects of side lobe emissions on the velocity measurement. The antenna unit is further characterized in that the effects of off axis radiation may be reduced to thereby improve the accuracy or precision of the velocity measurement. The antenna unit is suitable for use in either a velocity monitor having either a monostatic or a bistatic configuration but, for conservation of space, a monostatic configuration is preferred.

Although a specific preferred embodiment has been described in detail to illustrate the principles of the invention, various modifications may be made in the described embodiment without departing from the spirit and scope of the invention as defined by the appended claims. For example, in an alternative embodiment the absorber wedge may be eliminated in which case the radiation absorption capability of the aperture plate should be increased, as by increasing the thickness of at least its left end as viewed in the drawings, so that the aperture plate absorbs the radiation of the near side lobes. In this case the dimension of the aperture 68 measured parallel to the axis A—A may be reduced so that the left edge of the aperture serves the function of the edge 84 on the absorber plate. In a further embodiment, the absorber wedge may be used without the aperture plate but measurements made using this arrangement would not be as precise as measurements made with the preferred or alternative embodiments described above.

We claim:

1. An antenna unit comprising:
    a printed circuit antenna card having thereon a high gain antenna comprising a phased array of antenna elements for radiating energy as a continuous wave microwave signal in a radiation pattern including a main lobe and side lobes;
    a support block, said support block being transparent to the radiated signal and having a configuration including a first surface disposed at an angle of about 45° relative to a second surface;
    said printed circuit antenna card being secured to said support block at said second surface so that the radiated signal is directed toward said first surface; and,
    radiation absorber means disposed adjacent said support block for absorbing a portion of the energy radiated by said antenna in said main lobe to thereby modify said radiation pattern.

2. An antenna unit as claimed in claim 1 wherein said radiation absorber means comprises an aperture plate disposed adjacent said first surface, said aperture plate comprising a material which absorbs said radiated energy, said aperture plate having an opening therein for passing only a portion of the energy of said main lobe.

3. An antenna unit as claimed in claim 2 wherein said radiation absorber means further comprises an absorber wedge disposed in a recess in said support block for absorbing the energy of said side lobes on a first side of said main lobe.

4. An antenna unit as claimed in claim 1 and further comprising:
    a resilient compression pad disposed between said antenna card and said support block.

5. An antenna unit as claimed in claim 4 and further comprising a backing plate and fasteners for attaching said backing plate to said second surface, said antenna card and said compression pad being pressed toward said second surface by said backing plate.

6. An antenna unit as claimed in claim 5 wherein said antenna card includes circuits enclosed within a housing, said support block having a recess in said second surface into which said housing may extend.

7. An antenna unit as claimed in claim 1 wherein said radiation absorber means comprises an absorber wedge disposed in a recess in said support block, said absorber wedge being disposed so as to intercept and absorb the energy of said lobes on one side of said main lobe.

8. An antenna unit for monitoring, by the Doppler effect, the velocity of a material being conveyed through a pipe in an axial direction, said antenna unit being adapted for mounting on the pipe and comprising:
  a support block having first and second surfaces intersecting at an acute angle;
  a printed circuit antenna card having thereon a high gain antenna comprising a phased array of antenna elements for radiating continuous wave energy at a fixed frequency in a main lobe radiation pattern substantially symmetrical about a main lobe axis;
  an aperture plate disposed against said first surface, said aperture plate comprising a sheet of material for absorbing radiation incident thereon, and an aperture in said sheet;
  means for mounting said antenna card to said second surface so that said axis extends through said aperture at an angle of about 45° relative to the axial direction when the antenna unit is mounted on a pipe.

9. An antenna unit as claimed in claim 8 wherein said acute angle is about 45° and said first surface extends parallel to the axial direction when the antenna unit is mounted on the pipe.

10. An antenna unit as claimed in claim 9 wherein said support block is provided with holes extending through the support block for receiving fasteners which extend from said first surface to secure the antenna unit to the pipe.

11. An antenna unit as claimed in claim 8 and further comprising an absorber wedge disposed between said antenna card and said aperture plate for absorbing said lobe radiation radiated by the antenna on one side of the main lobe.

12. An antenna unit as claimed in claim 11 wherein said support block is provided with a recess for receiving said absorber wedge.

13. An antenna unit as claimed in claim 11 wherein said absorber wedge extends into said radiation pattern to intercept and absorb the energy of an off-axis portion of said main lobe.

14. An antenna unit as claimed in claim 13 wherein said absorber wedge, said aperture plate and said antenna are disposed relative to each other such that the most off-axis radiation of one side of said main lobe axis is absorbed by said absorber wedge and the most off-axis radiation on a second side of said main lobe axis is absorbed by said aperture plate.

15. An antenna unit as claimed in claim 14 wherein an angle α subtending the radiation passing through said aperture is bisected by said main lobe axis.

16. An antenna unit as claimed in claim 15 wherein the angle subtending radiation passing through said aperture is about 30°.

17. An antenna unit as claimed in claim 14 wherein an angle subtending radiation passing through said aperture is about 30°.

18. An antenna unit as claimed in claim 8 and further comprising a backing plate and a resilient compression pad disposed on opposite sides of said printed circuit antenna card, said compression pad being disposed between said printed circuit antenna card and said second surface, and fastening means extending through said backing plate and into said support block for securing the printed circuit card and compression pad to said second surface.

19. A method of improving the precision of a velocity measurement made by transmitting a constant frequency signal toward a flowing material in a radiation pattern which intercepts the material at a range of angles with respect to the axis of material flow, said method comprising:
  transmitting toward the material a main lobe of microwave energy having an axis intercepting the axis of flow at an angle of about 45°;
  shaping said main lobe by absorbing a portion of the off-axis radiation in said lobe to thereby leave only radiation radiated within an angle bisected by said main lobe axis for intercepting the material.

20. A method as claimed in claim 19 wherein said angle bisected by said main lobe axis is 30°.

* * * * *